United States Patent [19]
McKinley et al.

[11] 3,751,905
[45] Aug. 14, 1973

[54] GAS-STEAM GENERATING APPARATUS

[76] Inventors: Roe L. McKinley; Jack M. McKinley, both of P.O. Box 1342, Longview, Tex. 75601

[22] Filed: Aug. 26, 1971

[21] Appl. No.: 175,304

[52] U.S. Cl. .......... 60/39.05 R, 123/46 R, 417/340, 60/39.55
[51] Int. Cl. .............................................. F02g 3/02
[58] Field of Search ........................ 60/39.48, 39.55, 60/13 F, 39.05; 123/46 R; 417/340

[56] References Cited
UNITED STATES PATENTS

| | | | |
|---|---|---|---|
| 3,119,230 | 1/1964 | Kosoff | 60/13 F |
| 2,693,076 | 11/1954 | Francis | 60/13 F |
| 2,983,098 | 5/1961 | Bush | 417/340 |
| 3,129,878 | 4/1964 | Kosoff | 123/46 |
| 3,013,383 | 12/1961 | Malick | 60/39.55 |

*Primary Examiner*—Carlton R. Croyle
*Assistant Examiner*—Warren Olsen
*Attorney*—Imirie & Smiley

[57] ABSTRACT

Apparatus for generating a high pressure mixture of steam and combustion gases for utilization at a steam engine or the like. The apparatus includes a cylinder and a pair of opposed pistons movable toward and away from each other in the cylinder. The space between pistons comprises a combustion chamber, and an hydraulic fluid is present behind each cylinder, together with an hydraulic sub-system for regulating the pressure therein. An hydraulic accumulator in the sub-system is pressurized from a high pressure fluid source, the pressurized fluid from the accumulator then being used to drive the pistons together to heat and compress an air charge therebetween. Fuel is injected and ignites, and thereupon water is injected and spontaneously vaporizes to steam. The steam-gas mixture drives the pistons outwardly, displacing the hydraulic fluid to the accumulator. An exhaust valve at the combustion chamber now opens, and the pistons, driven by accumulator pressure, force the gas-steam mixture from the apparatus toward a utilization point.

9 Claims, 1 Drawing Figure

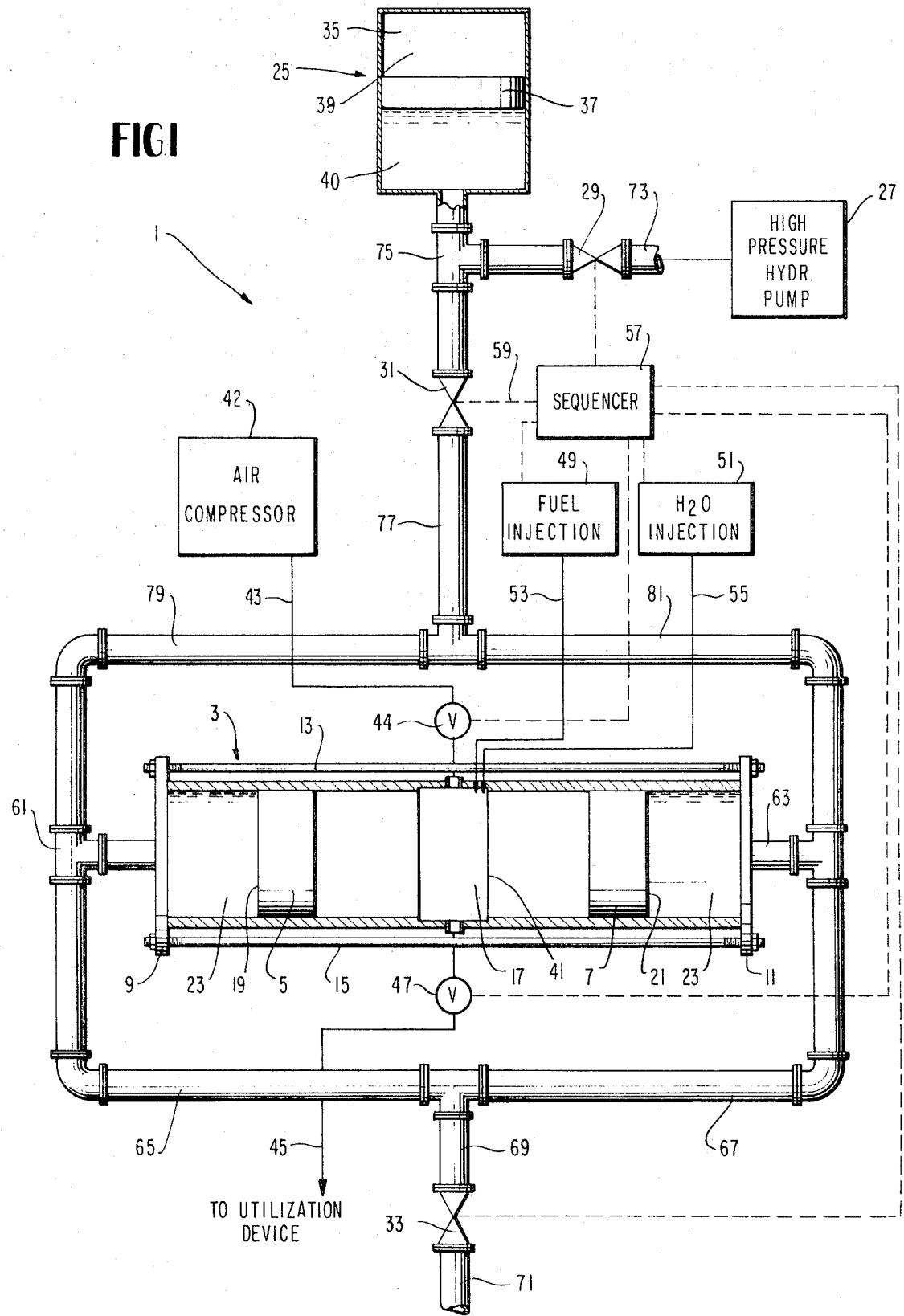

GAS-STEAM GENERATING APPARATUS

BACKGROUND OF INVENTION

This invention relates generally to power generating apparatus, and more specifically relates to apparatus for generation of high pressure steam and gases for use in driving engines and similar motive devices.

While in principle steam operated engines would appear to have many advantages suggesting widespread use thereof in vehicle and other small scale applications, it is well-known that such engines have found very limited use in such fields.

A principal difficulty in this connection has been that of providing a steam-based power plant which is of compact size and low weight, of sufficient simplicity as to be produceable at reasonable cost, and which operates with low enough ful consumption as to be commercially practical to operate—both from a viewpoint of fuel cost and of volume of fuel required to be carried by the vehicle. Many of the underlying problems in this connection have arisen from the need to provide in any successful steam power plant a source of high pressure, high temperature steam. Conventional boilers or the like are relative impractical for vehicle application, in terms of both size and weight, and moreover are a source of high air pollution—a problem of increasing concern in our industrialized society. Neither have numerous more sophisticated steam generation techniques, as have been proposed in recent years, proved to have any notable degree of acceptance, such approaches frequently being simply too complex and/or expensive to be practical for vehicle and similar applications.

SUMMARY OF INVENTION

Now in accordance with the present invention, apparatus is provided which is of low construction cost, of great simplicity and compactness, and which is yet capable of generating with minimal fuel requirements, a high pressure and high temperature steam-gas output, which output may then be furnished to a utilization point such as a steam engine or so forth.

The generating apparatus of the invention utilizes a cylinder and a pair of opposed pistons displaceable toward and away from each other within the said cylinder. An hydraulic fluid is present behind each piston, with the space between pistons defining a combustion chamber for the generator. An hydraulic sub-system regulates the pressure in the hydraulic fluid and, include an accumulator and source of high pressure fluid for pressurizing said accumulator at the initiation of a cycle of operation. Intake valving means at the combustion chamber are opened and compressed air drives the pistons outwardly expelling spent hydraulic fluid from behind the pistons through an open valving means. The pressurized fluid at the accumulator is then utilized to drive the pistons together, compressing and heating the air charge therebetween. Fuel injected in the chamber then ignites, after which water is injected into the expanding fuel charge and spontaneously vaporizes to steam. The steam-gas charge drives the pistons to their maximum outward stroke and forces the hydraulic fluid back into the accumulator. Exhaust valving means are then opened at the combustion chamber and the pressurized fluid at the accumulator drives the pistons toward each other expelling the steam-gas mixture through the valving means and toward a utilization device.

BRIEF DESCRIPTION OF THE DRAWING

FIGURE 1 is a schematic, partially sectional view of steam-gas generating apparatus in accordance with the invention, with portions of the apparatus appearing in block form.

DETAILED DESCRIPTION OF THE INVENTION

Referring now in detail to the drawing, specifically to FIGURE 1, steam-gas generating apparatus 1 is set forth, by way of a depiction which is partially sectioned in nature, but which for the most part is schematic and includes various elements in block schematic form. Apparatus 1 is seen to include generally a cylinder 3 in which are mounted a pair of opposed pistons 5, 7 which pistons are movable laterally (in the sense of the drawing) toward and away from each other. Cylinder 3 is bounded at each end thereof by a pair of end plates 9, 11, with stay bolts such as at 13 and 15 passing between the said plates and holding the assembly in compression. The pistons 5, 7 in the preferred embodiment set forth are freely floating in the cylinder, that is no connecting rods or so forth are utilized.

As will shortly be appreciated, the space 17 between opposed pistons 5, 7 comprises a combustion chamber for the generator. The pistons are sealed from the cylinder 3 walls by pistons rings (not shown) or similar means as are known in the art, so that no communication is possible between opposite sides of a piston. At the back sides 19, 21 of pistons 5, 7 an hydraulic fluid 23, such as an oil or the like, is present, such fluid being used to displace pistons 5, 7 inwardly during the course of cyclical operation of apparatus 1.

An hydraulic sub-system is present in apparatus 1 and acts to regulate pressure and flow of the hydraulic fluid in apparatus 1. The sub-system may be regarded as including hydraulic fluid accumulator 25, the source of high pressure hydraulic pump 27, first, second and third valving means 29, 31 and 33, respectively, together the various supply lines as will hereinafter be discussed.

Hydraulic fluid accumulator 25 preferably comprises a comparatively large cylinder 35 and a piston 37 freely movable therein. The upper portion 39 of cylinder 35 contains a compressible gas such as air; the lower portion 40 is normally occupied by hydraulic fluid, with the vertical position of piston 37 determining the degree of compression of the gas present in portion 39 and the pressure present on the hydraulic fluid.

The various inlet and outlets to combustion chamber 17 feed in to cylinder 3 at a centrally disposed, radially enlarged collar portion 41. In particular, an air inlet line 43 including a solenoid operated inlet valving means feeds in at such collar—the line 43 being fed by a conventional air compressor 42; similarly a schematically suggested outlet line 45 and controlling valve means 47 for such line, feeds outwardly from collar portion 41. In addition, fuel injection means 49 and water injection means 51 both feed their respective products into combustion chamber 17 at collar portion 41, via in these cases the schematically suggested feed lines 53, 55. Opening and closing of the various valving means, including specifically first, second and third valving means 29, 31 and 33 in the hydraulic sub-system, as well as of inlet valving means 44 and outlet valving means 47, is controlled by sequencer means 57, which provides electrical signals to the control relays of these solenoid-operated valves to accomplish the desired valving sequences.

Sequencer means 57 also provides times electrical signals for activating fuel injection means 49 and water injection means 51 at points in time appropriate for delivery of their products to the combustion chamber. Sequencer means 57 preferably comprises a simple mot or driven rotating cam shaft, the camed surfaces of which periodically activate microswitches for the several valves and injection systems. This type of control system is well-known in the art and no further details are deemed necessary regarding the nature of such system. The electtical connections between sequencer means 57 and the various controlled elements are depicted by the dotted lines, as at 59 between sequencer means and valving means 31.

A fuller understanding of the operation of the present invention may now best be had by following a cycle of operation in apparatus 1. Initially, then the pistons 3, 5 having completed a prior cycle of operation, are at their minimum stroke position—that is to say are at their point of closest approach. With exhaust valve 47 closed, valve 44 is opened and a charge of air begins to enter combustion chamber 17 from a conventional air compressor 42 via the line 43. The air pressure bgins to drive pistons 5 and 7 outwardly and against the hydraulic fluid 23 at the outer ends of the cylinder. During this "intake" stroke valving means 31 in the hydraulic sub-system is closed; third valving means 33, however, is in an open position. In consequence hydraulic fluid 23 displaced from the cylinder into tubes 61 and 63 at alternate ends of cylinder 3, is diverted through branches 65 and 67, through tube 69 and third valving means 33, and then through exit tube 71.

Because, as will shortly be evident, the fluid thus exiting has undergone heating as a result of work performed thereon, the fluid is quite hot. Accordingly the fluid, typically an oil, is preferably passed via tube 71 through a heat exchanger where cooling is effected, and then sent on to a storage tank. From such storage tank the oil may then, in turn, be passed through hydraulic pump 27, and thus recycled continuously through the apparatus. During the aforegoing intake step, high pressure hydraulic pump 27 has been delivering hydraulic fluid through tube 73 and open first valving means 29 into feeder tube 75. With second valving means 31 in a closed position, the hydraulic fluid is diverted to accumulator 25 where such fluid collects and is pressurized.

Sequencer means 57 now acts to effect the compression step of the cycle. In particular, with intake valving means 44 and exhaust valving means 47 closed, valving means 29 is closed and second valving means 31 opened. The highly pressurized hydraulic fluid now passes through tube 77, thence through branches 79 and 81, thence through tubes 61 and 63 into cylinder 3. Hydraulic pressure is now brought to bear upon pistons 3, 5 and the pistons are driven inwardly compressing and heating the air charge therebetween to a pressure of at least 650 pounds, or, depending upon the hydraulic system characteristics, higher.

With the pistons at their point of minimum approach, sequencer means 57 activates fuel injection means 49 and fuel is sprayed into the hot air charge and spontaneously explodes. Such fuel, in accordance with the present invention, preferably comprises a low-cost, medium-weight hydrocarbon, typically kerosene or a diesel grade oil. The injection apparatus utilized for such purposes, is conventional and well-known to those skilled in the art. While but a single line 53 is shown delivering such fuel in chamber 17, it is preferable to employ a plurality of injecting heads at the combustion chamber.

Under the influence of the fuel explosion, pistons 5, 7 begin moving outwardly. Into this extremely hot, high pressure expanding charge, water is now injected by water injection means 51 and line 55. The water, preferably again entering via a plurality of nozzles, instantly vaporizes to steam, creating an extremely high pressure, high temperature steam-gas mixture in combustion chamber 17. The ensuing, and continuing chain-like reaction drives pistons 5, 7 back to their maximum stroke, thereby forcing hydraulic fluid 23 through open valving means 31 into accumulator 25, the pressure in such accumulator becoming equal to that in the steam-gas mixture.

The exhaust step in the cyclic operation now ensures. In particular sequencer means 57 now opens exhaust valving means 47 at the combustion chamber, and the intense hydraulic pressure stored in accumulator 25 drives pistons 5, 7 inwardly, forcing the steam-gas mixture out through line 45 and toward a utilization device. While valving means 47 and line 45 are once again shown, for simplicity, as singular elements, it is preferable in practice to utilize a plurality of outlet ports at the combustion chamber. The existing steam-gas mixture is commonly led by line 45 to a pressure tank with the admixture being thereupon used to drive a conventional steam engine or the like.

Because of the very high pressures and temperatures (typically of the order of 3,000°F.) combustion within chamber 17 is so complete that only minor amounts of unoxidized or lowly oxidized hydrocarbons remain in the steam-gas mixture exiting from apparatus 1, in consequence of which air pollution resulting from ultimate discharge of such products is vastly reduced as compared to conventional power plants. This anti-pollution aspect of the invention is augmented by the fact that additional quantities of polluants, such as aldehydes, ketones or the like, as may form during the combustion process, are absorbed by the steam and carried in the ultimate condensate, rather than being discharged into the atmosphere.

While the present invention has been particularly set forth in terms of specific embodiments thereof, it will be understood in view of the instant disclosure, that numerous variations upon the invention are now enabled to those skilled in the art, which variations in propriety yet reside within the scope of the present teaching. For example, while the accumulator 25 has been shown as a single unit, a plurality of accumulators together with appropriate connecting lines may be utilized. Neither need such accumulators be so physically removed from the cylinder as is set forth in FIG. 1. For example, a pair of similarly structure accumulators may be positioned at alternate ends of Cylinder 3 with connecting lines being appropriately modified to provide overall a very compact unified structure. In view of remarks such as the foregoing, the present invention is to be broadly construed, and limited only by the scope and spirit of the claims appended hereto.

We claim:

1. Gas-steam generating apparatus, comprising in combination:
   a cylinder;
   a pair of opposed pistons movable inwardly and outwardly in said cylinder, the space therebetween defining a combustion chamber for said apparatus;
   an hydraulic fluid behind each said piston;
   an hydraulic sub-system for regulating the pressure in said hydraulic fluid, said sub-system including an hydraulic fluid accumulator, a source of high pressure fluid and a supply line connecting said source to said accumulator, a first valving means in the said supply line operable for pressurizing said accumulator, a second valving means between the accumulator and said pistons operable to apply the accumulator pressure at said pistons, and a third valving means operable to vent spent fluid from behind said pistons;
   intake valving means for introducing compressed air into said combustion chamber to drive said pistons outwardly and thereby expel spent hydraulic fluid to initiate a cycle of operation of said generator;
   fuel injection means for injecting fuel for ignition into said combustion chamber upon said air being compressed and heated by the inward movement of said pistons due to said accumulator pressure;
   water injection means for injecting water into the ignited charge in said combustion chamber to spontaneously vaporize into steam in said chamber;
   exhaust valving means at said combustion chamber operable to vent gases and steam from said chamber toward a point of utilization; and
   sequencing means for sequencing opening and closing of said first, second, third, exhaust, and intake valving means, and for operating said fuel and water injection means, said sequencing means being operable to sequentially: (1) open said intake and third valving means prior to a cycle of operation to exhaust said fluid and provide an air charge in said combustion chamber; (2) close said second and third valving means while opening said first valving means to thereby store and pressurize fluid in said accumulator; (3) close said first and third valving means while opening said second valving means to vent said pressurized fluid against said pistons to compress and heat said air therebetween; (4) activate said fuel injection means to inject combustible fuel into said hot compressed air to ignite said fuel and drive said pistons outwardly; (5) activate said water injection means to inject water into the ignited fuel charge to vaporize said water into steam thereby increasing the pressure driving said pistons outwardly, said outward movement driving said fluid into said accumulator and pressurizing said fluid; (6) open said exhaust valve means upon said pistons reaching their full stroke, thereby permitting said accumulated hydraulic pressure to drive said pistons inwardly exhausting said gases and steam.

2. Apparatus in accordance with claim 1, wherein said accumulator comprises a piston and cylinder, said hydraulic fluid accumulating at one side of said piston, the opposite side of said piston enclosing a compressible gas.

3. Apparatus in accordance with claim 2, wherein the said opposed pistons are freely floating.

4. Apparatus in accordance with claim 2, wherein at least said first, second and third valving means are solenoid operated, and wherein said sequencing means comprises a rotating cam shaft and switches operable by said cams to in turn operate said valving means.

5. Apparatus in accordance with claim 2 wherein said third valving means is connected a heat exchanger and storage tank for cooling and recycling said hydraulic fluid.

6. Apparatus in accordance with claim 2, including a plurality of said accumulators.

7. Gas-steam generating apparatus, comprising in combination;
   a cylinder;
   a pair of opposed pistons movable inwardly and outwardly in said cylinder, the space therebetween defining a combustion chamber for said apparatus;
   an hydraulic fluid behind each said piston;
   an hydraulic sub-system for regulating the pressure in said hydraulic fluid, said sub-system including an hydraulic fluid accumulator, a source of high pressure fluid and a supply line connecting said source to said accumulator, a first valving means in the said supply line operable for pressurizing said accumulator, a second valving means between the accumulator and said pistons operable to apply the accumulator pressure at said pistons, and a third valving means operable to vent spent fluid from behind said pistons;
   intake valving means for introducing compressed air into said combustion chamber to drive said pistons outwardly and thereby expel spent hydraulic fluid to initiate a cycle of operation of said generator;
   means for introducing fuel into said combustion chamber for ignition;
   water injection means for injecting water into an ignited fuel-air charge in said combustion chamber to spontaneously vaporize into steam in said chamber;
   exhaust valving means at said combustion chamber operable to vent gases and steam from said chamber toward a point of utilization; and
   sequencing means for sequencing opening and closing of said first, second, third, exhaust, and intake valving means, and for operating water injection means, said sequencing means being operable to sequentially: (1) open said intake and third valving means prior to a cycle of operation to exhaust said fluid and provide an air charge in said combustion chamber; (2) close said second and third valving means while opening said first valving means to thereby store and pressurize fluid in said accumulator; (3) close said first and third valving means while opening said second valving means to direct said pressurized fluid against said pistons to compress and heat said air therebetween; (4) activate said water injection means to inject water into the ignited charge to vaporize said water into steam thereby increasing the pressure driving said pistons outwardly, said outward movement driving said fluid into said accumulator and pressurizing said fluid; (5) open said exhaust valve means upon said pistons reaching their full stroke, thereby permitting said accumulated hydraulic pressure to drive said pistons inwardly exhausting said gases and steam through said exhaust valving means and toward said point of utilization.

8. Gas-steam generating apparatus, comprising in combination;

a cylinder;

at least one piston movable in said cylinder, the piston cooperating with the cylinder to define a combustion chamber in front of the piston;

an hydraulic fluid behind said piston;

an hydraulic sub-system for regulating the pressure in said hydraulic fluid, said sub-system including an hydraulic fluid accumulator, a source of high pressure fluid and a supply line connecting said source to said accumulator, a first valving means in the said supply line operable for pressurizing said accumulator, a second valving means between the accumulator and said piston operable to apply the accumulator pressure at said piston, and a third valving means operable to vent spent fluid from behind said piston;

intake valving means for introducing compressed air into said combustion chamber to drive said piston rearwardly and thereby expel spent hydraulic fluid to initiate a cycle of operation of said generator;

fuel injection means for injecting fuel for ignition into said combustion chamber upon said air being compressed and heated by the inward movement of said piston due to accumulator pressure;

water injection means for injecting water into the ignited charge in said combustion chamber to spontaneously vaporize into steam in said chamber;

exhaust valving means at said combustion chamber operable to vent gases and steam from said chamber toward a point of utilization; and sequencing means for sequencing opening and closing of said first, second, third, exhaust, and intake valving means, and for operating said fuel and water injection means;

said sequencing means being operable to sequentially: (1) open said intake and third valving means prior to a cycle of operation to exhaust said fluid and provide an air charge in said combustion chamber; (2) close said second and third valving means while opening said first valving means to thereby store and pressurize fluid in said accumulator; (3) close said first and third valving means while opening said second valving means to direct said pressurized fluid against said piston to compress and heat said air in front of the piston; (4) activate said fuel injection means to inject combustible fuel into said hot compressed air to ignite said fuel and drive said piston rearwardly; (5) activate said water injection means to inject water into the ignited fuel charge to vaporize said water into steam thereby driving said piston rearwardly, the rearward movement driving said fluid into said accumulator and pressurizing said fluid; (6) open said exhaust valve means upon said piston reaching its full stroke, thereby permitting said accumulated hydraulic pressure to drive said piston inwardly exhausting said gases and steam through said exhaust valving means and toward said point of utilization.

9. A method of operating a free piston engine in a four cycle mode of operation to generate high pressure gas-steam, the engine being of the type having a pair of opposed free floating pistons movable inwardly and outwardly in a cylinder, with the space between the pistons defining a combustion chamber, the method comprising, in combination, intially introducing hydraulic fluid into a space behind each of the pistons;

causing an intake cycle by introducing compressed air into the combustion chamber between the pistons while venting the hydraulic fluid to a low pressure region to drive the pistons outwardly and expel hydraulic fluid from the space behind each piston;

causing a compression cycle immediately after the intake cycle by forcing hydraulic fluid under high pressure into the spaces behind the pistons to move the pistons inwardly to compress and heat the air between the pistons;

causing a combustion cycle immediately following the compression cycle by injecting fuel into the heated and compressed air to force the pistons outwardly under the action of the combustion while maintaining the spaces behind the pistons in communication with an hydraulic accumulator so the force of combustion expels hydraulic fluid from the spaces behind the pistons and increases the pressure of the hydraulic fluid in the accumulator;

injecting water into the combustion chamber during the combustion cycle to spontaneously vaporize the water into steam;

causing an exhaust cycle by releasing the combustion products and steam from the cylinder immediately after the combustion cycle while maintaining the space behind the pistons in communication with the accumulator so the accumulator pressure acting on the hydraulic fluid drives the pistons toward each other and expels the combustion gas and steam from the combustion chamber; and repeating the above sequence of operations to generate additional high pressure gas-steam.

* * * * *